United States Patent [19]

Hiestand

[11] Patent Number: 4,598,917
[45] Date of Patent: Jul. 8, 1986

[54] POWER CHUCK, PARTICULARLY FOR TURNING MACHINES

[75] Inventor: Karl Hiestand, Pfullendorf, Fed. Rep. of Germany

[73] Assignee: S M W Schneider & Weisshaupt GmbH, Fed. Rep. of Germany

[21] Appl. No.: 693,132

[22] Filed: Jan. 22, 1985

Related U.S. Application Data

[63] Continuation of Ser. No. 442,793, Nov. 18, 1982, abandoned.

[30] Foreign Application Priority Data

Nov. 21, 1981 [DE] Fed. Rep. of Germany ....... 3146171

[51] Int. Cl.[4] .............................................. B23B 31/30
[52] U.S. Cl. .................................. 279/1 J; 279/1 L; 279/4; 279/121
[58] Field of Search ............... 279/1 R, 1 J, 1 L, 2 A, 279/4, 110, 121

[56] References Cited

U.S. PATENT DOCUMENTS 3,456,956  7/1969  Herbkersman ........................... 279/4
3,814,448  6/1974  Buck ..................................... 279/1 J Primary Examiner—Gil Weidenfeld
Assistant Examiner—Glenn L. Webb
Attorney, Agent, or Firm—McGlew and Tuttle

[57] ABSTRACT

In a power chuck 1, particularly for turning machines, the drive member 11 which act through oblique surface 10-12 on the radially displaceable jaws 4 are each firmly connected to a setting piston 17 which is movable in the axial direction A, of the chuck. To effect a balanced chucking, the setting pistons are exposed to operating pressure fluid on one or both sides and can be displaced independently of each other. To displace all the drive members 11 conjointly, an actuating member 21 is provided acting on drive members 11 or the setting pistons 17 at least in one jaw-setting direction, or being positively connectable thereto. This makes it possible to chuck a workpiece centrically or eccentrically and no particular means for switching from one mode to the other are needed.

14 Claims, 3 Drawing Figures

POWER CHUCK, PARTICULARLY FOR TURNING MACHINES

This is a continuation, of application Ser. No. 442,793 filed Nov. 18, 1982, abandoned.

FIELD AND BACKGROUND OF THE INVENTION

This invention relates in general to chucks and in particular to a new and useful power chuck including setting pistons which act on drive members for displacing individual chuck jaws with uniform pressure to permit uniform chucking of the workpiece.

Power chucks are known in numerous designs and have proved satisfactory in practice. The drive members are provided in the shape of wedge bars, wedge hooks, toggle levers, or similar intermediate elements through which a movement of a connecting rod or a piston is mechanically transmitted to the jaws. In this way, all the jaws of a chuck are displaced through the same radial distance during a chucking operation, so that in every instance a centric outside or inside chucking is obtained.

Further known, from German OS No. 30 00 416, is a power chuck permitting not only a centric but also a balanced chucking. For this purpose, the jaws which are displaceable by means of a spring loaded setting bolt provided with a taper strip engaging the jaw, are equipped with chucking bolts which are inserted therein and project radially inwardly or outwardly beyond the jaw. Each chucking bolt is associated with a balancing hydraulic piston and cylinder. The cylinder spaces of the balancing cylinders communicate with each other through flexible tubes and form a closed hydraulic system which is adjustable from the outside by means of a setting piston.

In their positions corresponding to the pressureless condition of the hydraulic system, the chucking bolts apply against a stop of the jaws, through which the chucking force is directly transmitted from the jaw to the chucking bolt. With a balanced chucking, on the contrary, the chucking bolts are backed up in a floating manner and can adapt to the contour of the workpiece.

In this power chuck, it is possible to switch from one chucking mode to the other by means of a manually operated setting piston, however, the chuck is very expensive in manufacture. No economical production can be provided and the complicated construction with pressures up to 300 bar acting on the elastic seals necessarily entails disturbances in the manufacturing process. The primary drawback, however, is that the switching must always be effected with the chuck stopped, by manually setting the piston back and forth, to force the pressure fluid into the hydraulic system, or to produce a corresponding free space for the chucking bolts applying against the jaws.

SUMMARY OF THE INVENTION

The invention is directed to a power chuck of the above-mentioned kind permitting a centric as well as a balanced chucking, without the necessity of a time consuming switching operation. The switching from one to the other mode of chucking is rather to be effected without any precaution to be taken. Further, the chuck is to be of simple construction making possible an economical manufacture without difficulties and with a minimum of disturbances.

In accordance with the invention, a power chuck comprises a chuck body which has a plurality of radially extending jaw guide grooves positioned around a central axial bore of the chuck being movable inwardly and outwardly for clamping and releasing a workpiece positioned in the bore. The jaws have a drive surface thereon which is engaged by individual drive members for each jaw which are displaceable in the chuck body and have an obliquely extending drive surface which engages the drive surface of the bore. A setting piston is mounted in the chuck body for displacement in axial directions and it is moved by fluid pressure to cause a pressure to act on a setting piston in a manner to subject each of the driving members to a uniform pressure and move them to displace the jaws with uniform driving pressure against the workpiece. The construction includes an actuating member in the form of an annular piston which is acted upon by fluid pressure from one or both sides to cause a corresponding displacement of the setting piston. The drive members are actuated by the setting pistons which in turn are actuated by the annular piston which act on the individual setting pistons in an axially sequential arrangement and with a pressure space being provided between the setting piston and the annular piston.

The setting pistons are advantageously inserted in recesses of the chuck body which are provided within the annular piston and are preferably open in the direction of the jaws which are to be displaced. The setting pistons may also advantageously be set in recesses of the chuck body and they are provided on the sides which are remote from the drive members with an extension in the form of a piston rod which extends through the pressure space associated with the respective setting pistons and through which the annular piston acts on the setting pistons to effect a centric chucking.

Advantageously, the pressure space is associated with the setting piston to communicate with each other, for example, through a circular channel provided in the chuck body or in an annular piston. A check valve is inserted in the pressure fluid supply conduit common to the pressure spaces and a pressure relief valve is associated with these pressure spaces. According to this provision even an eccentrically chucked workpiece can be brought into a centric position without the need of releasing the clamping forces acting on the individual jaws.

Another advantageous arrangement is that the drive members have a polygonal cross-section with oblique surfaces cooperating with respective jaws. The drive members advantageously are non-rotatably mounted for displacement in the chuck body and wherein a sleeve which is non-rotatably retained therein.

In order to relieve the drive members and/or the setting pistons from transverse forces, it is advisable that the annular piston is non-rotatably connected to the chuck body through one or more driver pins which are guided for displacement.

It may also be provided that the chuck body is cup-shaped enclosed on its rear side of the chuck body by a cover which is clamped to the chuck body by means of a sleeve extending through the chuck body and bearing thereagainst.

The inventive power chuck is not only simple in design, inexpensive to manufacture, and reliable in operation, but also very versatile in application, for both centric and balanced chucking, without the need of particular measures for switching from one to the other mode. That is, since the jaws are associated with drive members combined with setting pistons and displaceable through an actuating member, the possibility is given to chuck a workpiece according to its contour with mutually balanced clamping forces, and then to displace it into a centric position by correspondingly moving the actuating member. No separate switching operation is necessary, only the pressure fluid is supplied either into the pressure space associated with the setting pistons, or into the pressure space of the actuating member.

Even non-circular workpieces may thus easily be clamped eccentrically for the following machining. Further, the balancing mode of clamping may be used to take hold of a workpiece which can then be clamped by means of a second chuck provided further back. Then, by displacing the actuating member and confining the pressure fluid in the pressure spaces associated with the setting piston, with of course, a limitation of the pressure thus augmented, the workpiece held fast in the jaws is brought into a centric position. This is a very advantageous and versatile modification of the handling of a workpiece.

Accordingly, it is an object of the invention to provide a chuck in which an actuating member is provided with acts on drive members for setting pistons which displace jaws to engage a workpiece either concentrically or eccentrically and do not require separate means for switching from one mode to the other.

A further object of the invention is to provide a power chuck which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which preferred embodiments of the invention are illustrated.

DESCRIPTION OF THE PREFERRED EMBODIMENTS

Figure 1:
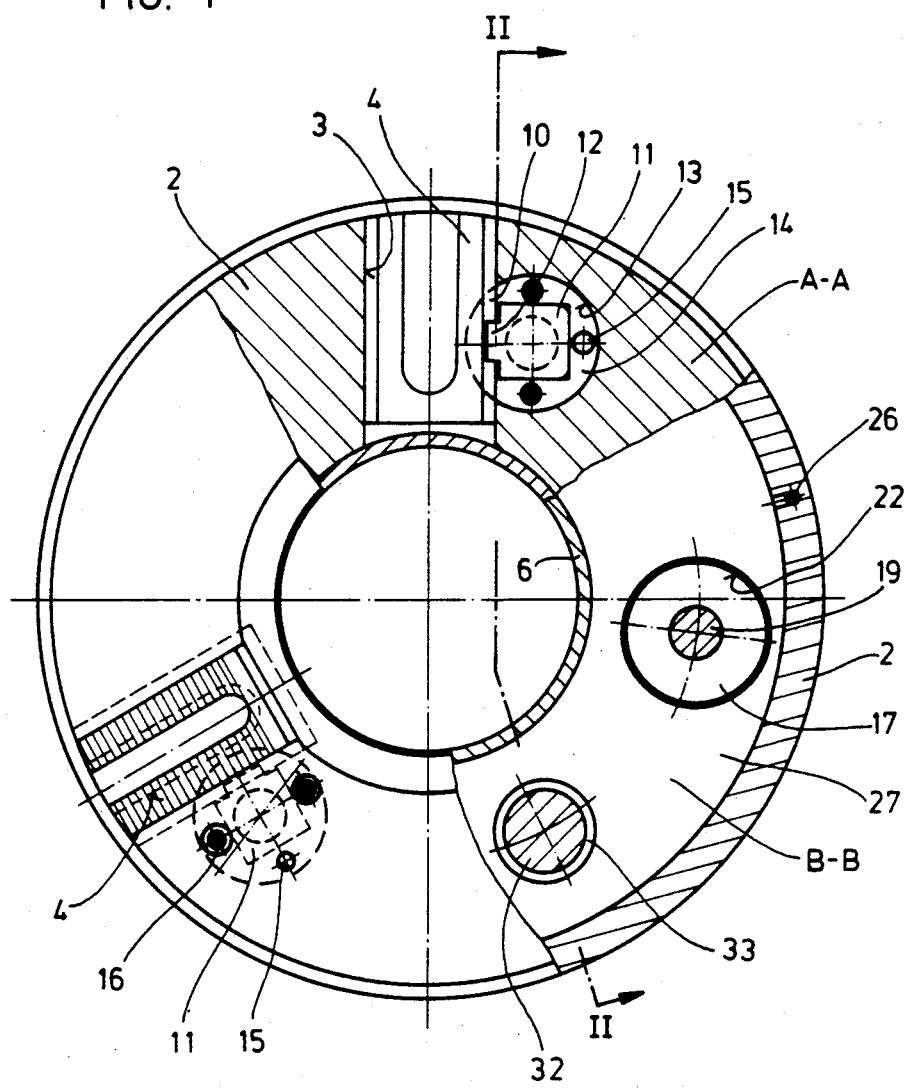
FIG. 1 is a partial front elevational and sectional view of a power chuck constructed in accordance with the invention.
Figure 2:
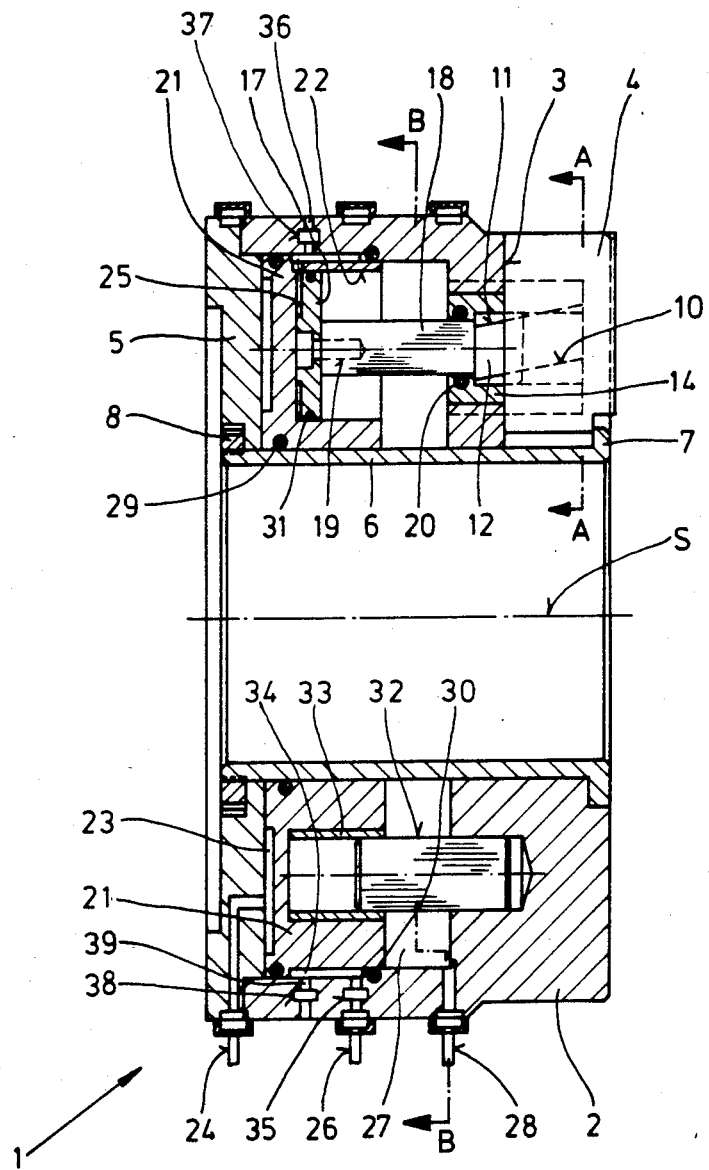
FIG. 2 is a section taken along the line II—II of FIG. 1.

The power chuck shown in FIGS. 1 and 2, and generally designated 1 comprises a cup-shaped chuck body 2 in which master or clamping jaws 4 are mounted for displacement in several, preferably three, radial grooves 3. By means of a cover 5, chuck body 2 is closed on the rear side of the chuck. Cover 5 is in addition, bracingly engaged with the front side of chuck body 2. For this purpose, a sleeve 6 is provided which extends through, and bears against, body 2 by a flange 7, and fixes cover 5 in place by means of a nut 8. This ensures a firm connection between chuck body 2 and the cover 5.

To actuate jaws 4, drive members 11 are provided which are displaceable in respect to a central axis S of the chuck and cooperate through oblique surfaces 12 with opposite surfaces 10 which are provided on jaws 4.

Drive members 11 have rectangular cross sections with the oblique surfaces 12 being provided on the sides facing jaws 4, and are displaceably received in a bushing 14 which is non-rotatably held in position in a bore 13 of chuck body 2, by means of a fixing pin 15 and screws 16. This is shown particularly in FIGS. 1 and 2.

Each drive member 11 has an extension in the form of a rod 18 which extends in the axial direction S of the chuck and to which a setting piston 17 is secured by means of a screw 19. The passage of rod 18 through sleeve 14 is sealed by a packing 20. An annular piston 21 is designed as an actuating member for simultaneously displacing all the setting pistons of chuck 1, and provided with recesses 22 which are open in the direction of jaws 4 and in which setting pistons 17 are received.

As soon as annular piston 21 in its position shown in FIG. 2 is exposed to pressure fluid which is supplied through a line 24, into a pressure space 23 associated therewith, piston 21 is displaced to the right and since setting pistons 17 apply against annular piston 21, all the pistons 17 and drive members 11 are positively displaced in this direction, and the axial motion is transformed by means of oblique surfaces 10 and 12 into radial forces by which a centric chucking of a workpiece may be effected through jaws 4.

However, another pressure space 25 is provided between annular piston 21 and each individual setting piston 17, to which pressure fluid can be supplied through a line 26. Therefore, setting pistons 17 may also be actuated independently of annular piston 21. If pressure fluid is supplied to pressure space 25, with pressure space 23 and the pressure space 27 at the opposite side of piston 17 vented, setting pistons 17 and drive members 11 connected thereto are displaced to the right and jaws 4 are displaced through oblique surfaces 12 and 10 radially inwardly. This motion of the jaws takes place conjointly only until one of jaws 4 applies against the workpiece to be clamped and thus encounters an increased resistance. However, this jaw still does not produce a clamping force since the other jaws continue to move farther. Therefore, pressure in pressure space 25 is still not augmented. Only after all the jaws 4 have applied against the workpiece, the pressure in pressure space 25 rises to a predetermined value, so that the workpiece becomes clamped between jaws 4.

The chucking resulting therefrom is not necessarily centric, it corresponds to the outer contour of the workpiece, so that a so called balanced clamping or chucking is obtained. Usually, the workpiece is thus clamped in chuck 1 eccentrically.

If under these conditions pressure fluid is supplied to pressure space 23, while maintaining, by means of a check valve 35, shown in FIG. 2, the pressure in pressure spaces 25 which communicate with each other through a circular groove 34 provided in annular piston 21, a clamped workpiece can be brought from its eccentric position into a centric position, without releasing its firm hold in the jaws. That is, due to the advance of annular piston 21 and since jaws 4 apply against the workpiece, the pressure in pressure space 25 of individual pistons 17 rises, yet pressure fluid is taken away through a pressure release valve 38 provided in line 39, so that with the pressure remaining almost constant, annular piston 21 can move. As soon as piston 21 butts against the setting piston 17 connected to the jaw 4, in an outermost position, the setting piston is taken along and the jaw associated therewith is pushed inwardly, while the other jaws give way outwardly until their associated setting pistons 17 also apply against annular piston 21. During this process, the volume of the pressure fluid in pressure space 25 and in circular groove 34 is continually reduced through pressure relief valve 38, as a function of the pressure of the operating fluid. The eccentrically chucked workpiece is thus brought into a centric position without reducing the clamping force, and in this centric position, upon venting pressure spaces 25 through a vent valve 37 provided in a venting line 36 shown in FIG. 2, the clamping force is transmitted to drive member 11 from annular piston 21.

Setting piston 17 can be exposed to the operating fluids on both sides, so that not only shaft but also annular structures can be clamped in the balancing mode. In the latter case, with pressure spaces 23 and 25 vented, operating fluid is supplied into space 27 between annular piston 21 and the front face of chuck body 2 through a line 28. The pressure then building up in space 27 displaces annular piston 21 immediately into the end position thereof shown in FIG. 2, however, the individual setting pistons 17 are moved to the left only until the jaws 4 associated therewith come to apply against the workpiece to be chucked. Only after all the jaws are in contact with the workpiece, the clamping pressure proper builds up. Setting pistons 17 are thus displaceable to the left independently of each other too.

Pressure spaces 23, 25 and 27 are sealed relative to each other by packings 29, 30 and 31 inserted in annular piston 21, chuck body 2, and setting pistons 17. Annular piston 21 is non-rotatably connected with chuck body by means of three driver pins 32 which are inserted in the chuck body and on which the piston 17 is slidably engaged through sleeve 33. This prevents setting pistons 17 from canting in recesses 22 and piston 21 is thereby rather exactly guided in body 2 as shown in the section of FIG. 1 corresponding to line B—B of FIG. 2.

Figure 3:
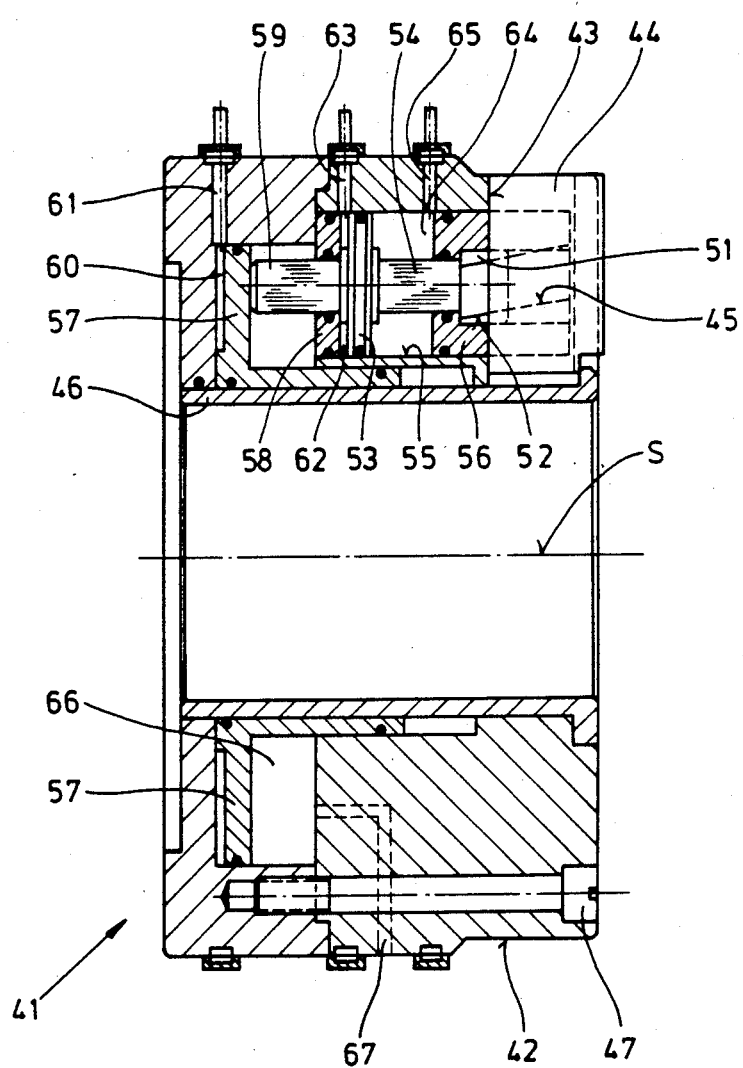
FIG. 3 is a view similar to FIG. 2 of another embodiment of the invention.

In the embodiment of FIG. 3, which is almost identical with that of FIGS. 1 and 2, again the jaws 44 are slidably guided in grooves 43 of chuck body 42 and actuable by means of drive members 51 which are displaceable alongside in the axial direction, S. Drive members 51 are provided with oblique surfaces 52 cooperating with opposite surfaces 45 of jaws 44. Chuck body 42 is made of two parts which are held assembled by screws 47 and retains a sleeve 46 in the center bore.

Setting pistons 53 are connected each through a rod 54 to the respective drive member 51 and, in this embdiment, mounted for displacement in recesses 55 provided in chuck body 42, and closed at the front side by bushings 56. Drive members 51 are also slidably guided in bushings 56 which are secured against rotation. The actuating member is again designed as an annular piston 57 and produces its effect through piston rods 59, which are provided on setting pistons 53 and extend through another bushing 58 which is inserted in recess 55. Pressure spaces 62 are thereby formed between bushing 58 and settng pistons 53, which can be supplied with operating fluid through a conduit 63.

Upon supplying pressure fluid through the conduit 61 into pressure space 60 associated with annular piston 57, a centric chucking of the workpiece is effected since, as shown in FIG. 3, all piston rods 59 apply against annular piston 57 and will be uniformly displaced to the right. Thereby, jaws 4 are also uniformly moved inwardly, since the axial movement of drive members 51 is transformed into a radial gripping motion through oblique surfaces 52 and 45. During this motion, space 66 opposite to pressure space 60 is vented through a conduit 67.

If, however, setting pistons 53 are exposed to operating fluid by supplying this fluid into pressure spaces 62, pistons 53 can individually perform their own movements until their respective jaws 4 apply against the workpiece. Then, a workpiece is chucked in a balanced way, in accordance with the outer contour thereof. During this balanced chucking operation, the spaces 64 at the other side of the setting pistons must be vented, of course.

A balanced internal chucking is also possible. To this end, pressure fluid is supplied through a conduit 65 into annular space 64, and spaces 60 and 62 are vented. Since there is no positive connection, setting pistons 33 are displaceable from a right-hand end position individually to the left, so that the jaw coupled thereto can be moved outwardly into contact with the workpiece whereupon the clamping pressure proper builds up in space 64.

While specific embodiments of the invention have been shown and described in detail to illustrate the application of the principles of the invention, it will be understood that the invention may be embodied otherwise without departing from such principles.

What is claimed is:
1. A power chuck, comprising:
   a cylindrical chuck body defining an annular chamber and having a central axial bore and a plurality of radially extending guide grooves defined in said body and extending radially of said axial bore;
   a jaw guided in each of said grooves for radial inward and outward movement for clamping and releasing a workpiece positioned in said bore and having a drive surface thereon;
   a drive member for each jaw axially displaceable in said body and having an obliquely extending driving surface engaged with said drive surface of said jaw for displacing said jaw;
   a separate setting piston for each drive member, each settng piston mounted in said chuck body for displacement in an axial direction of said chuck body and connected directly to one drive member for movement with said one drive member;
   a single annular actuating member movably mounted in said annular chamber of said chuck body on one axial side of each setting piston and engageable with each setting piston to jointly move each setting piston in one axial direction, said actuating member defining a first annular pressure space with said chuck body in said annular chamber;
   a first pressure connection connected to said body and communicating with said first pressure space for supplying pressure fluid to said first pressure space to move said annular member axially in said annular chamber;
   each setting piston defining a separate second pressure space;
   said body defining a passage connected to all of said separate second pressure spaces for communicating all of said separate second pressure spaces with each other, said second pressure space and said passage being independent of said first pressure connection and said first pressure space;
   a second pressure connection connected to said body and communicating with said passage for supplying pressure fluid to said passage independently of said first pressure connection;

pressure means connected to said second pressure connection for supplying pressure fluid to said passage to cause movement of each setting piston independently to subject each respective driving member to a pressure so as to move each respective driving member to displace each jaw against a workpiece independently, said pressure means being connected to said first pressure connection for supplying pressure fluid to said first pressure connection independently of the supply of pressure fluid to said second pressure connection for moving said annular actuator axially in a direction toward and against each setting piston; and pressure relief means connected to said body and communicating with said passage for venting pressure fluid at a selected pressure from said passage so that with pressure fluid supplied to said first pressure connection said actuator can move toward and engage with each setting piston, said pressure relief means comprising a third pressure connection which is independent of said first pressure connection and which is connected to said body and communicating with said passage, and a pressure relief valve in said third pressure connection.

2. A power chuck according to claim 1, wherein said annular actuating member comprises an annular piston, each setting piston movable in said annular piston, each separate second pressure space being defined between said annular piston and each setting piston respectively, said body having a circular groove defining said passage for communicating said separate second pressure spaces with each other.

3. A power chuck according to claim 2, wherein said body defines a further annular space on a side of each setting piston opposite from said annular piston, and a fourth pressure connection connected to said further annular space for applying pressure fluid to a side of each setting piston opposite from said annular piston.

4. A power chuck according to claim 1, wherein each setting piston defines its separate second pressure space with said chuck body, said pressure means moving each setting piston in a first axial direction when pressure fluid is applied to said passage, each settng piston defining a third pressure space with said body, a further pressure connection connected to said body and communicating with said third pressure space for receiving pressure fluid to move each setting piston in a second axial direction opposite from said first axial direction.

5. A power chuck according to claim 4, wherein said pressure relief means comprise said third pressure connection connected to said body and communicating with said passage and a check valve connected in said third pressure connection 6. A chuck according to claim 2, including a third pressure connection connected to said chuck body and communicating with a third chamber between each setting piston and said chuck body for moving each setting piston independently and in an opposite axial direction opposite to said one axial direction.

7. A chuck body according to claim 6, including a one-way valve connected in said second pressure connection for preventing flow of pressure fluid out of said second chamber.

8. A power chuck according to claim 1, wherein said actuating member comprising an annular piston, said chuck body having an annular chamber in which said annular piston is axially movable and wherein said pressure means includes means for supplying pressure to said chamber to displace said annular piston.

9. A power chuck according to claim 1, wherein said drive member comprise individual members displaceable in said chuck body and each connected to a setting piston, said actuating members comprising an annular actuating piston, said chuck body having a plurality of chambers therein with said setting piston in said annular piston being arranged in axially sequential arrangement defining pressure spaces therebetween and also between said setting piston and said drive member.

10. A power chuck according to claim 1, wherein said actuating member comprises an annular piston, said chuck body having a chamber defined therein in which said annular piston is movable and said setting piston being arranged within said annular piston and being open in the direction of said jaws.

11. A power chuck according to claim 10, wherein said setting pistons are provided on the side remote from said drive members with an extension in the form of a piston rod, said annular piston acting on said piston rod to effect a centric chucking.

12. A power chuck according to claim 1, wherein said drive members have a polygonal cross section with an oblique surface forming said oblique driving surface provided on its outside facing said jaw, said drive member being non-rotatably mounted for displacement in said chuck body.

13. A power chuck according to claim 1, wherein said actuating member comprises an annular piston movable in an annular chamber of said chuck body, said annular piston being non-rotatably connected to said chuck body and including a driver pin in said chuck body on which said annular piston is guided for displacement.

14. A power chuck according to claim 1, wherein said chuck body is cup-shaped enclosed on one side by a cover and including a sleeve extending through said chuck body and bearing against said cover.

* * * * *